United States Patent [19]

Orecchio

[11] Patent Number: 4,665,616
[45] Date of Patent: May 19, 1987

[54] CABLE JACKET SLITTING APPARATUS

[75] Inventor: Nicholas L. Orecchio, Longmeadow, Mass.

[73] Assignee: United Technologies Corporation, Hartford, Conn.

[21] Appl. No.: 783,382

[22] Filed: Oct. 3, 1985

[51] Int. Cl.[4] ............................................. H02G 1/12
[52] U.S. Cl. ...................................... 30/90.4; 30/90.8
[58] Field of Search ................... 30/90.4, 90.8, 91.2; 81/9.41, 9.42, 9.43, 9.51

[56] References Cited

U.S. PATENT DOCUMENTS

| | | | |
|---|---|---|---|
| 2,452,423 | 10/1948 | Bass | 81/9.51 |
| 2,624,221 | 1/1953 | Schneider | 30/90.4 |
| 2,929,286 | 3/1960 | Blakely | 81/9.51 |
| 3,375,579 | 4/1968 | Slonksnes | 30/90.8 |
| 3,541,896 | 11/1970 | Watson | 81/9.51 |
| 3,872,590 | 3/1975 | Hill | 30/90.6 |
| 3,898,733 | 8/1975 | Cormier | 30/90.4 |
| 3,902,206 | 9/1975 | Naguin | 7/5.4 |
| 3,914,864 | 10/1975 | Prince | 30/90.6 |
| 3,915,037 | 10/1975 | Wiener | 81/9.5 A |
| 4,083,105 | 4/1978 | Vipond | 30/90.4 |
| 4,189,799 | 2/1980 | Litehizer, Jr. | 7/107 |
| 4,215,470 | 8/1980 | Chirichigno | 30/90.8 |
| 4,306,923 | 12/1981 | MacPherson | 156/51 |
| 4,309,822 | 1/1982 | Chirichigno | 30/90.9 |
| 4,379,665 | 4/1983 | Hendershot et al. | 408/204 |
| 4,534,254 | 8/1985 | Budzich | 81/9.51 |

FOREIGN PATENT DOCUMENTS 628724  9/1949  United Kingdom .................. 30/90.8

Primary Examiner—Jimmy C. Peters
Attorney, Agent, or Firm—William J. Sapone

[57] ABSTRACT

A cable jacket slitting apparatus automatically pierces a cable jacket to a controlled depth at a tangent between two adjacent wires and automatically follows the tangent path as the jacket is slit. Two semicylindrical cam halves, (1, 23) disposed in aligned opposition within a housing (30), include longitudinal recesses (2, 24) having grooved sidewalls (4, 26) which conform to the helical contour of an electric cable jacket (5). The two cam halves are driven into mutual contact by a contoured surface (37) on the housing sidewall (31), the two cam half recesses forming a passage (48) which loosely grips the cable within the grooves in the sidewall. One of the cam halves carries a cutting rod (7) with a knife end (8) which pierces the cable jacket between a pair of adjacent wires. As the cable is drawn through the passage, the cam halves rotate about the longitudinal axis of the cable, helically slitting the jacket in a continuous helical direction around a longitudinal axis between a pair of adjacent wires.

4 Claims, 5 Drawing Figures

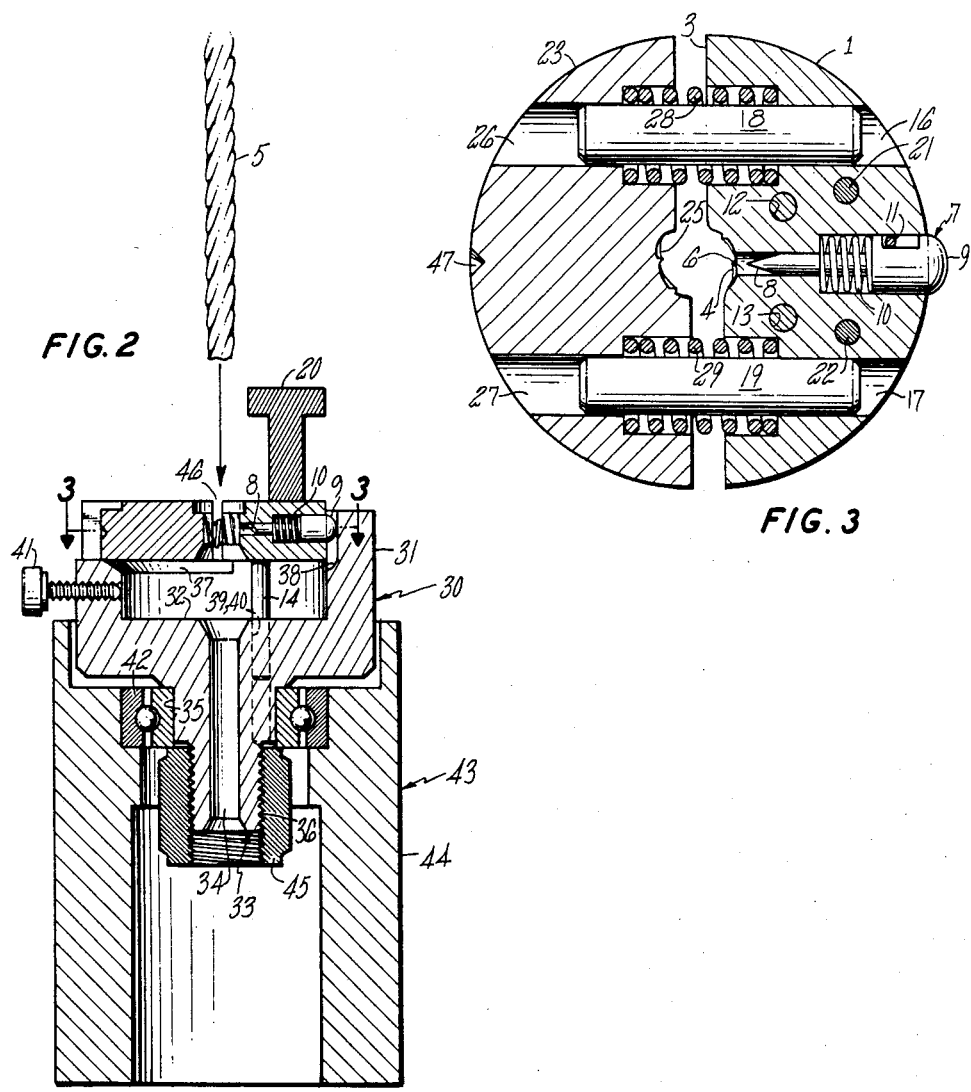
FIG. 2
FIG. 3
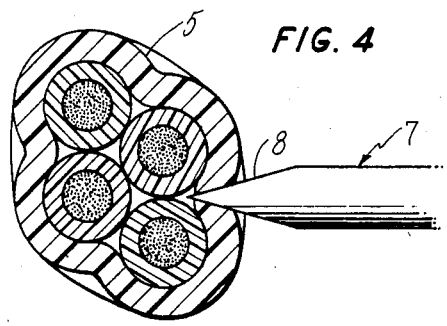
FIG. 4

4,665,616

CABLE JACKET SLITTING APPARATUS

DESCRIPTION

1. Technical Field

This invention relates to apparatus for slitting the outer protective jacket of electric cable and more particularly to apparatus for automatically piercing the jacket to a controlled depth at a tangent between a pair of adjacent inner wires, automatically following that tangent as the jacket is slit.

2. Background Art

Electric cable is generally formed by combining two or more electric wires and covering them with an outer protective jacket. This jacket is usually tough and sturdy to prevent damaging the inner wires during installation. To improve cable flexibility, the inner wires are usually twisted, with the jacket shape generally reflecting the helical twist of the inner wires. To complete electrical connections, the ends of the protective jacket are longitudinally slit, peeled back and removed, thereby exposing the individual wires.

Improperly slitting the cable jacket can damage the inner wires. If apparatus used to slit the jacket pierces too deeply, or is improperly positioned in relation to the helical pattern of the inner wires, as for example, by slitting straight across helically twisted inner wires, the underlying wires can be pierced or severed. When such damage occurs, the improperly slit cable end must usually be cut off and the slitting operation repeated on the shortened cable. Such a practice is wasteful of both operator time and cable material.

Several devices are known in the prior art for use in slitting the outer jacket of electric cable. Most are hand-held devices which include a fixed knife blade extending into a passage parallel to a cable received within the passage. Generally, an operator manually positions the cable within the passage in relation to the knife blade and adjusts the blade to achieve the proper depth of penetration of the cable jacket. An example of such a device is disclosed in U.S. Pat. No. 4,615,116 to Hanson et al., having a common assignee herewith. By carefully pulling the cable through the passage, a slit can be made without damaging the inner wires. However, helically contoured cable jackets are difficult to slit without damaging the inner twisted wires because in such cable, a proper slit must follow a helical path between two adjacent inner wires. With prior art apparatus, even careful operator attention to the slitting operation may, in some circumstances, fail to result in a helical slit. When drawing a cable through such prior art apparatus, the twisted configuration of the jacket can apply a twisting torque to the cable as it passes the fixed knife blade. This torque can misalign the cable with the knife blade, causing the blade to cut into the adjacent wires.

A major use for cable slitters is in the mass production wiring of various devices. Such manufacturing assembly line operations require a number of slits to be completed in a given time. Prior art slitters, relying on manual positioning, often do not exhibit the necessary consistency, speed and accuracy required for mass production. Consequently, a need has developed for an apparatus which can quickly and automatically slit a helically shaped cable jacket without damaging the inner wires.

DISCLOSURE OF INVENTION

It is an object of the present invention to provide an apparatus which automatically pierces a cable jacket to a controlled depth at a tangent between two adjacent inner wires.

It is a further object of the present invention to provide an apparatus which automatically slits the cable jacket along a tangential path between two adjacent inner wires, thereby preventing damage to such inner wires.

According to this invention, a rotatable cam, having a longitudinal passage apertured in conformance to the contour of a cable jacket, is supported on a base with a piercing and slitting means, such as a cutting rod, carried by the cam. As a cable is telescoped through the passage, the piercing means is automatically positioned to pierce the cable to a controlled depth at a tangent between two adjacent inner wires. As the cable traverses the passage, the cam and piercing means rotate in correspondence to the helical contour of the jacket shape, helically slitting the cable around the longitudinal axis of the cable. Allowing free rotation of the cam prevents the helical contour of the jacket from misaligning the piercing means, thereby preventing damage to the inner wires.

In the preferred embodiment, the cam is bifurcated, for ease in loading a cable into the apparatus, and retained within a cylindrical housing. Contoured surfaces on the housing sidewall direct the bifurcated cam into mutual engagement with the cable and direct the piercing means into penetrating the cable jacket as the bifurcated cam is closed around the cable. The piercing depth is determined by the depth dimension of one of the contoured surfaces.

In operation, a cable is inserted through the bifurcated cam and housing. The bifurcated cam is pushed downwardly into the housing, and, guided by one of the contoured surfaces on the housing sidewall, is directed into mutual engagement with the cable in the longitudinal cam passage. Simultaneously, the cutting rod is driven into the cable by the other contoured surface, piercing the cable jacket to a controlled depth at a tangent between two adjacent wires. As the cable is drawn through the passage, the cam, cutting rod and housing rotate within the base in correspondence to the helical jacket shape, slitting the jacket helically around a longitudinal axis.

BRIEF DESCRIPTION OF DRAWINGS

FIG. 2 is a sectional elevation showing cable insertion into the apparatus;

FIG. 3 is a sectional view taken in the direction of line 3—3 of FIG. 2;

FIG. 4 is a sectional view of a typical cable, illustrating the shape of a jacket being pierced by the apparatus at a tangent between two adjacent inner wires.

BEST MODE FOR CARRYING OUT THE INVENTION

Figure 1:
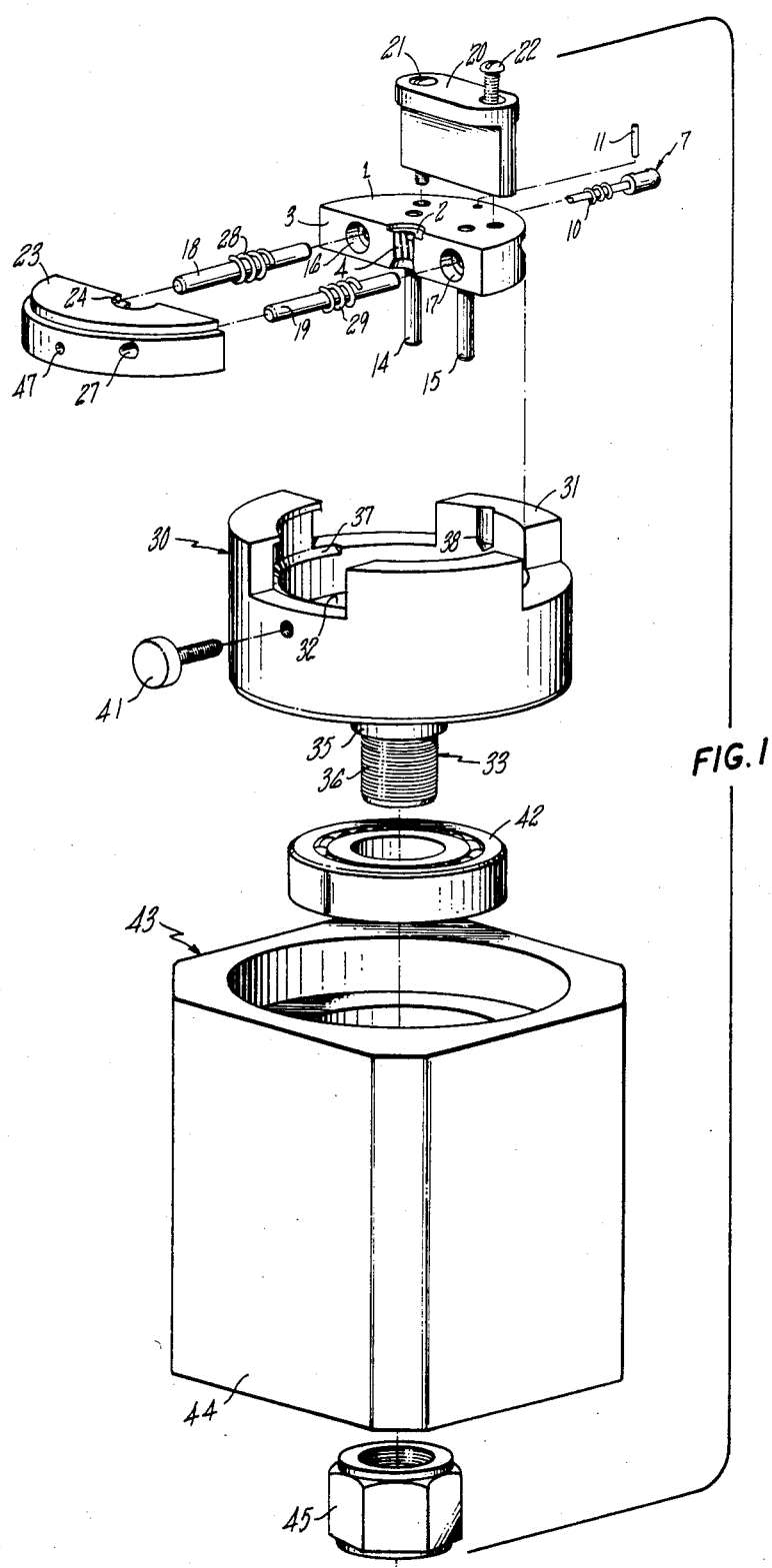
FIG. 1 is an exploded view of the preferred embodiment of the cable jacket slitting apparatus of the present invention.

Referring to FIG. 1, a right semicylindrical cam half 1 has a longitudinal recess 2 in the center of a flat rectangular wall 3. The recess 2 has a helically grooved sidewall 4 which conforms to the semihelical contour of an electric cable jacket covering a plurality of twisted wires. For illustrative purposes, an electric cable 5, containing four inner wires, is shown in FIGS. 2 and 4. However, this invention is applicable to any electric cable containing two or more inner wires. Referring now to FIG. 3, a counterbored, horizontal cylindrical guide chamber 6 within cam half 1 is aligned with an apex of a groove on the sidewall 4. A cutting rod 7 having a knife end 8 and an opposite follower 9 is disposed within chamber 6 and reciprocally movable therein. A spring 10 is disposed within the counterbore in chamber 6 and applies pressure to outwardly bias follower 9. A retaining pin 11, vertically disposed within cam half 1 and passing through a slot in follower 9, retains cutting rod 7 within chamber 6. Cam half 1 has four cylindrical bores, two vertical bores 12 and 13 for accommodating two vertical alignment dowell pins 14 and 15 (see FIG. 1) and two counterbored, horizontal bores 16 and 17 for accommodating two horizontal alignment dowell pins 18 and 19. Dowell pins 14, 15, 18, and 19 are rigidly fixed within bores 12, 13, 16 and 17. A handle 20 is attached to the top of cam half 1 by screws 21 and 22 (see FIG. 1).

Figure 5:
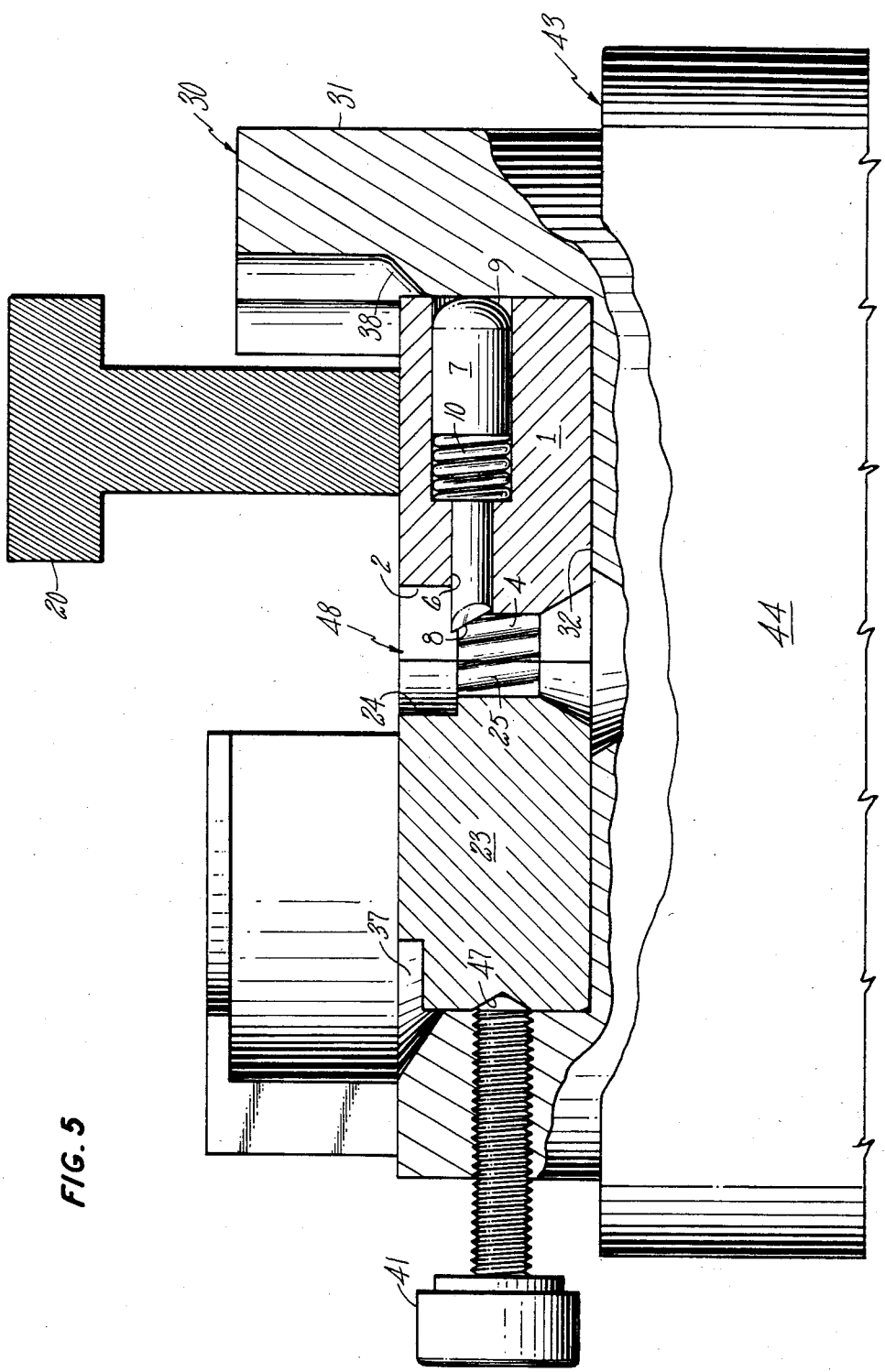
FIG. 5 is an enlarged fragmentary, partially sectioned view showing the apparatus in a locked position.

Referring to FIG. 5, a left semicylindrical cam half 23 is positioned in aligned opposition to the right semicylindrical cam half 1 and has a longitudinal recess 24 in aligned opposition to recess 2 with a grooved sidewall 25 which conform to the semihelical contour of electric cable jacket 5. Referring now to FIG. 3, the left cam half 23 has two counterbored, horizontal cylindrical bores 26 and 27 for accommodating the two horizontal alignment dowell pins 18 and 19 which are reciprocally movable therein. Springs 28 and 29, which outwardly bias cam halves 1 and 23 to maintain the normal separation thereof, are disposed over the two dowel pins 18 and 19 and retained within the counterbores in chambers 16, 17, 26 and 27.

Referring to FIG. 2, the left and right cam halves nest within an open generally cylindrical housing 30. This housing has a sidewall 31, a planar bottom wall 32 and a longitudinally extending shank 33. A longitudinal passage 34, extends through the center of bottom wall 32 and shank 33 and accommodates telescoping of electric cable 5 through housing 30. Shank 33 has an annular bearing retaining surface 35 and a threaded end 36. Sidewall 31 includes a first contoured surface 37 which directs the left and right cam halves reciprocally into engagement with cable 5 and a second contoured surface 38 which directs the cutting rod 7 through chamber 6 into penetrating cable 5 telescoped therethrough (see FIG. 4 for enlarged view). The two vertical alignment dowell pins 14 and 15 are accommodated and reciprocally movable within two vertical cylindrical bores 39 and 40 in housing 30. A locking setscrew 41, for locking cam halves 1 and 23 in engagement, is threaded into an aperture on sidewall 31. A ball bearing set 42 is fixed within a base 43, preferably by press fitting. The base has sidewalls 44 which are counterbored to accommodate bearing 42 and housing 30. Bearing 42 is secured to housing 30 by a locknut 45 which is attached to threaded end 36 of shank 33. Bearing set 42 supports the rotation of housing 30 within base 43.

Referring to FIG. 2, the preferred embodiment of the apparatus of the present invention is shown prior to cable insertion. The left and right cam halves 1 and 23 are biased apart into spaced opposition by springs 28 and 29, defining an aperture 46 through which electric cable 5 is inserted. Knife end 8 is retracted from aperture 46 by the force of spring 10 on follower 9. Locking setscrew 41 is flush with sidewall 31.

Referring to FIG. 5, a fragmentary enlargement of the apparatus of the present invention is shown in the locked position. Using handle 20, the left and right cam halves are pushed downwardly into housing 30 until they abut bottom wall 32, being driven into mutual contact by contoured surface 37 on housing 30. Locking setscrew 41 is received by dimple 47 on left cam half 23, locking the bifurcated cam halves in mutual contact. When cam halves 1 and 23 are so engaged, the two recesses 2 and 24 form a single, helically grooved longitudinal passage 48. Electric cable 5 (FIG. 2) is loosely gripped within passage 48 by the grooves in the passage sidewalls which conform to the helical shape of the cable jacket. Cutting rod 7 is driven through chamber 6 into passage 48 by contoured surface 38 engaging follower 9 as the cam halves are pushed downwardly. The geometry of contoured surface 38 controls the depth to which knife end 8 pierces the cable jacket at a tangent between two adjacent wires.

As the cable is manually drawn through the apparatus past knife end 8, the grooved sidewall on passage 48 causes rotation of the bifurcated cam about the longitudinal cable axis, slitting the jacket in a continuous helical direction along the tangential path between two adjacent inner wires. Bearing 42 supports the free rotation of housing 30 within base 43, preventing the helical jacket pattern from misaligning knife end 8 relative to the inner wires, thereby preventing damage to the adjacent inner wires.

It is thus seen that this invention provides rapid slitting of an electric cable without damage to the inner wires. Depth of penetration and location of the slit are automatically determined by the contoured surface geometry and grooved sidewall passage while free rotation of the housing prevents misalignment of the piercing means as the cable is drawn through the apparatus. Operator tasks are reduced to inserting the cable, locking the apparatus and withdrawing the cable.

While the preferred embodiment is described in relation to semicylindrical cam halves within a cylindrical housing having contoured surface sidewalls, it will be understood by those skilled in the art that modifications in cam geometry, size, cutting rod length, locking means, contoured surface shapes and other structures can be made without departing from the present invention:

I claim:

1. An apparatus for slitting a helically contoured outer jacket of a cable comprising a plurality of twisted wires, said apparatus characterized by:
   a bifurcated cam comprising a first cam half and a second cam half, oppositely disposed and reciprocally movable into contact, said first cam half including a first recess and said second cam half including a second recess in aligned opposition to said first recess, which together provide a longitudinal passage when such cam halves are in contact, said passage apertured in conformance to said helically contoured outer jacket of said cable;
   means carried by said first cam half for piercing and slitting said jacket, said slitting means reciprocally movable within said first cam half and extendable therefrom to a controlled length, providing a controlled depth of slit at a tangent between a pair of said twisted wires;

a cylindrical housing within which said bifurcated cam is located, said housing including a first contoured surface engageable by said cam halves for directing said cam halves into mutual engagement, thereby engaging said cable within said passage, and, a second contoured surface engageable by said slitting means for directing said slitting means into said cable; and, a base, within which said housing is located, said housing being rotatable with respect thereto;

whereby drawing said cable longitudinally through said passage rotates said cam, housing and slitting means about a longitudinal axis of said cable, slitting said jacket between a pair of said twisted wires.

2. The apparatus of claim 1 wherein said piercing and slitting means comprise a cutting rod disposed within a chamber in said first cam half, said cutting rod including a knife end and an opposite follower which engages said second contoured surface.

3. The apparatus of claim 2 further characterized by a spring disposed over said cutting rod for urging said follower into contact with said second contoured surface.

4. The apparatus of claim 1 further characterized by locking means which lock said cam halves in engagement.

* * * * *